Patented Oct. 23, 1923.

1,471,344

UNITED STATES PATENT OFFICE.

HENRI LOUDIN, OF QUEBEC, QUEBEC, CANADA.

INSECT-REPELLENT COMPOSITION.

No Drawing.  Application filed April 6, 1921.  Serial No. 459,188.

*To all whom it may concern:*

Be it known that I, HENRI LOUDIN, a subject of the King of England, residing at Quebec, Province of Quebec, Canada, have made a certain new and useful Invention in Insect-Repellent Composition, of which the following is a specification.

This invention relates to a composition and method of making the same which is exceedingly efficient as a repellent to flies, mosquitoes, and similar annoying insects.

The invention consists in the product and the method employed in obtaining the same, all as will be more fully hereinafter set forth.

In accordance with my invention, I mix equal parts of phenyl salicylate and camphor until complete liquefaction occurs, and then add a variable quantity of white medicinal petroleum oil, in accordance with the strength of the solution desired. The solution thus obtained is not disagreeable to the one using the same, and is wholly harmless to the skin, and to a great extent protects the skin from sunburn, and therefore forms a solution which may with comfort be used for the purpose above outlined, while at the same time the solution is exceedingly repellent to insects.

Having now set forth the objects and nature of my invention what I claim as new and useful and of my own invention and desire to secure by Letters Patent is,—

1. The method of making an insect repellent, which consists in mixing phenyl salicylate and camphor, and to the solution thus obtained adding white medicinal petroleum oil.

2. The method of making an insect repellent which comprises uniting and mixing equal parts of phenyl salicylate and camphor to complete liquefaction and then adding medicinal petrolatum oil to the desired degree.

3. An insect repellent comprising phenyl salicylate and camphor united and mixed to a state of liquefaction and having added thereto white medicinal petrolatum oil.

4. As an article of manufacture an insect repellent comprising equal parts of phenyl salicylate and camphor mixed to a state of liquefaction and having incorporated therewith white medicinal petrolatum.

In testimony whereof I have hereunto set my hand on this 28th day of January A. D., 1920.

HENRI LOUDIN.